(12) United States Patent
Gamache et al.

(10) Patent No.: US 9,004,449 B2
(45) Date of Patent: Apr. 14, 2015

(54) CONICAL ROTARY VALVE FOR CHROMATOGRAPHIC APPLICATIONS

(75) Inventors: Yves Gamache, Adstock (CA); André Fortier, Adstock (CA)

(73) Assignee: Mecanique Analytique Inc., Thetford-Mines (Quebec) (CA)

( * ) Notice: Subject to any disclaimer, the term of this patent is extended or adjusted under 35 U.S.C. 154(b) by 358 days.

(21) Appl. No.: 13/498,789

(22) PCT Filed: Sep. 30, 2010

(86) PCT No.: PCT/CA2010/001567
§ 371 (c)(1),
(2), (4) Date: Mar. 28, 2012

(87) PCT Pub. No.: WO2011/038511
PCT Pub. Date: Apr. 7, 2011

(65) Prior Publication Data
US 2012/0181466 A1     Jul. 19, 2012

Related U.S. Application Data

(60) Provisional application No. 61/247,164, filed on Sep. 30, 2009.

(51) Int. Cl.
| | |
|---|---|
| F16K 31/528 | (2006.01) |
| F16K 51/00 | (2006.01) |
| F16C 29/02 | (2006.01) |
| F16C 17/02 | (2006.01) |
| F16K 5/02 | (2006.01) |
| F16K 5/08 | (2006.01) |

(52) U.S. Cl.
CPC ............... *F16K 5/0242* (2013.01); *F16K 5/08* (2013.01); *F16K 31/528* (2013.01)

(58) Field of Classification Search
CPC ..... F16K 5/0242; F16K 31/528; F16K 35/06; F16K 5/0626; F16K 5/0631
USPC ............................ 251/213, 286, 288, 129.14, 251/315.01–315.14; 384/129–449
See application file for complete search history.

(56) References Cited

U.S. PATENT DOCUMENTS

| | | | | |
|---|---|---|---|---|
| 729,672 A | * | 6/1903 | Sack | 251/288 |
| 1,784,636 A | * | 12/1930 | Leins | 251/286 |

(Continued)

FOREIGN PATENT DOCUMENTS

DE         19845684         4/2000

*Primary Examiner* — John K Fristoe, Jr.
*Assistant Examiner* — Seth W Mackay-Smith
(74) *Attorney, Agent, or Firm* — Price Heneveld LLP

(57) ABSTRACT

A conical rotary valve for chromatographic applications is provided, including a valve stator, a valve rotor, a drive adaptor and a pair of stoppers each mounted to the stator. The drive adaptor is rotatable and coupled to the valve rotor for transmitting a rotating force thereto. The drive adaptor has a body and a pair of radial arms projecting from the body radially outward from the axis of rotation on opposite sides thereof. Each of the pair of radial arms is movable along a respective arcuate travelling course with respect to the stator. The stoppers are each positioned to obstruct one of the radial arms at an end of the corresponding travelling course. The stoppers are positioned to simultaneously engage the radial arms, thereby balancing the reaction forces created within the valve when the radial arms reach the ends of their travelling courses.

15 Claims, 11 Drawing Sheets

(56) References Cited

U.S. PATENT DOCUMENTS

| | | | | |
|---|---|---|---|---|
| 2,044,254 A * | 6/1936 | Mueller | | 251/96 |
| 2,642,257 A * | 6/1953 | Mueller et al. | | 251/183 |
| 2,677,561 A * | 5/1954 | Mueller et al. | | 384/149 |
| 2,913,219 A * | 11/1959 | Freed | | 251/288 |
| 2,994,341 A * | 8/1961 | Leopold, Jr. et al. | | 137/382 |
| 3,083,945 A * | 4/1963 | Shafer et al. | | 251/363 |
| 3,151,837 A * | 10/1964 | Bentley-Leek | | 251/214 |
| 3,207,468 A * | 9/1965 | Lauducci et al. | | 251/58 |
| 3,272,473 A * | 9/1966 | Veit et al. | | 251/174 |
| 3,380,472 A * | 4/1968 | Leighton | | 137/360 |
| 3,473,551 A * | 10/1969 | Murauskas | | 137/269 |
| 3,477,691 A * | 11/1969 | Hitchcock et al. | | 251/172 |
| 3,528,448 A * | 9/1970 | Urban | | 137/242 |
| 3,531,081 A * | 9/1970 | Scaramucci | | 251/151 |
| 3,536,295 A * | 10/1970 | Sinkler | | 251/164 |
| 3,687,414 A * | 8/1972 | Petty | | 251/77 |
| 3,729,170 A * | 4/1973 | Lewis et al. | | 251/315.08 |
| 3,743,245 A | 7/1973 | Demler, Sr. | | |
| 3,922,044 A * | 11/1975 | Bucalo | | 384/276 |
| 4,813,455 A * | 3/1989 | Iqbal | | 137/625.17 |
| 4,957,008 A | 9/1990 | Proni et al. | | |
| 5,579,804 A * | 12/1996 | Roberts | | 137/385 |
| 6,676,109 B2 * | 1/2004 | Gomi et al. | | 251/288 |
| 7,137,410 B2 * | 11/2006 | Rosko | | 137/625.17 |
| 2001/0045231 A1 * | 11/2001 | Monod | | 137/454.2 |

* cited by examiner

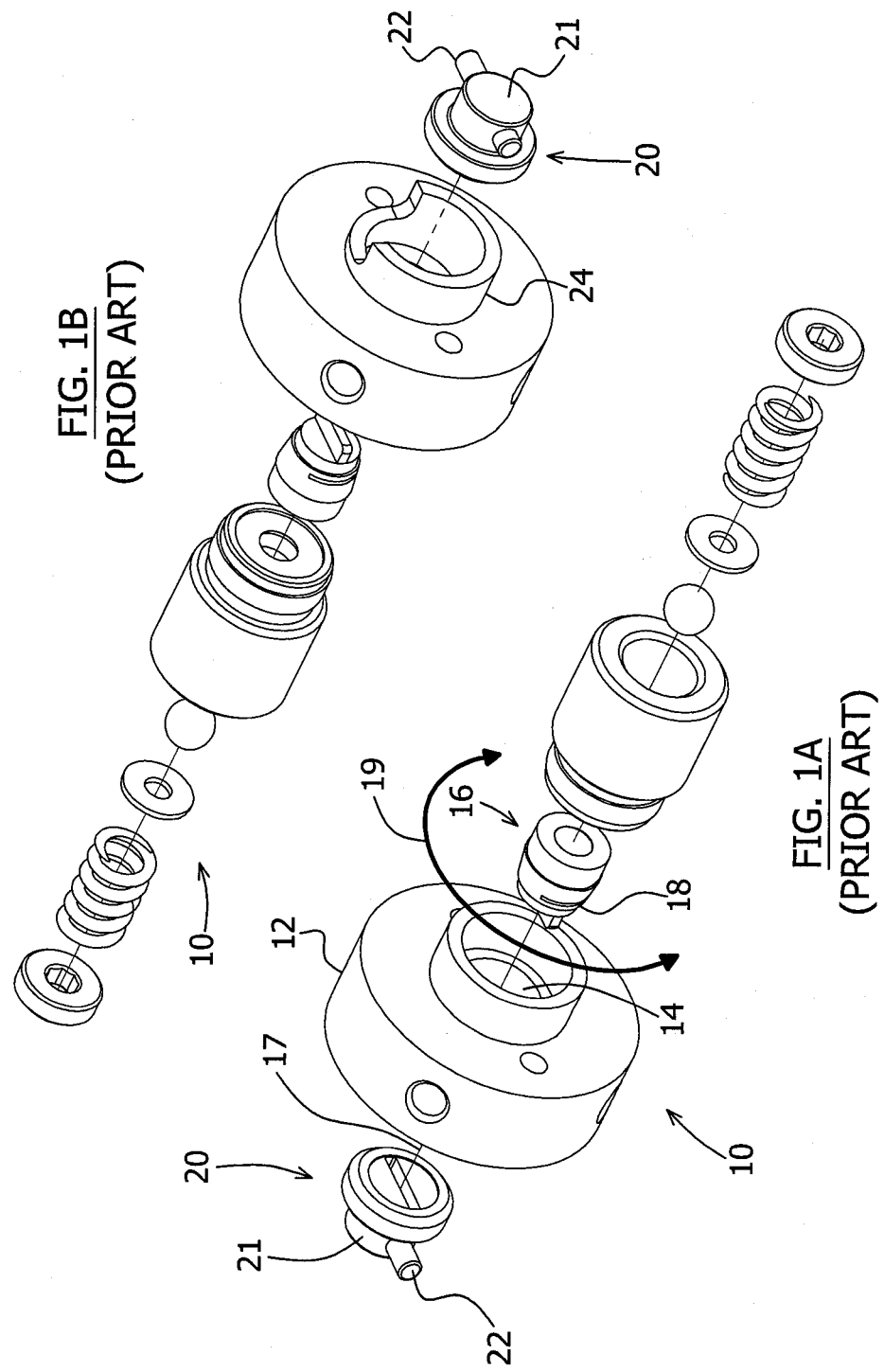

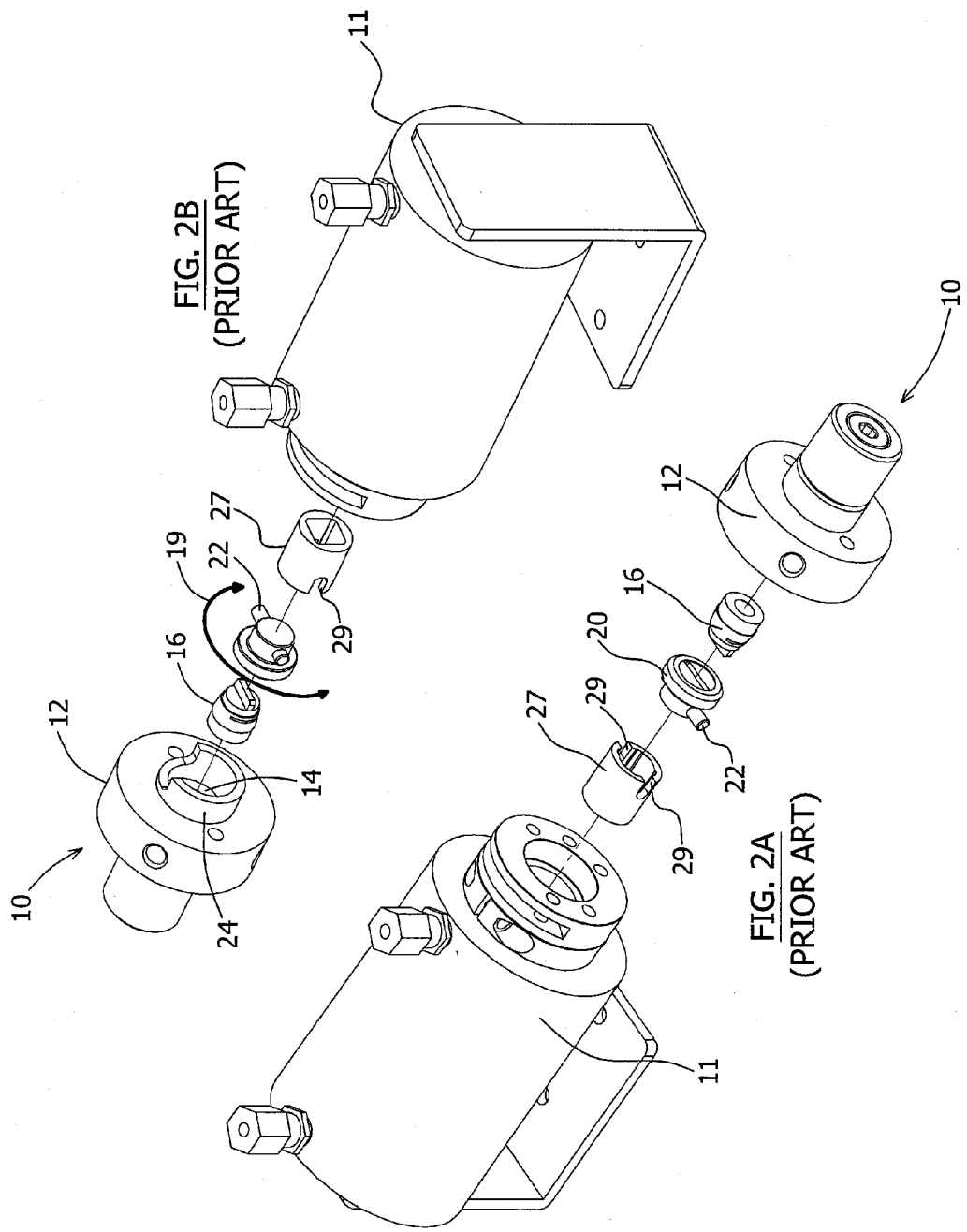

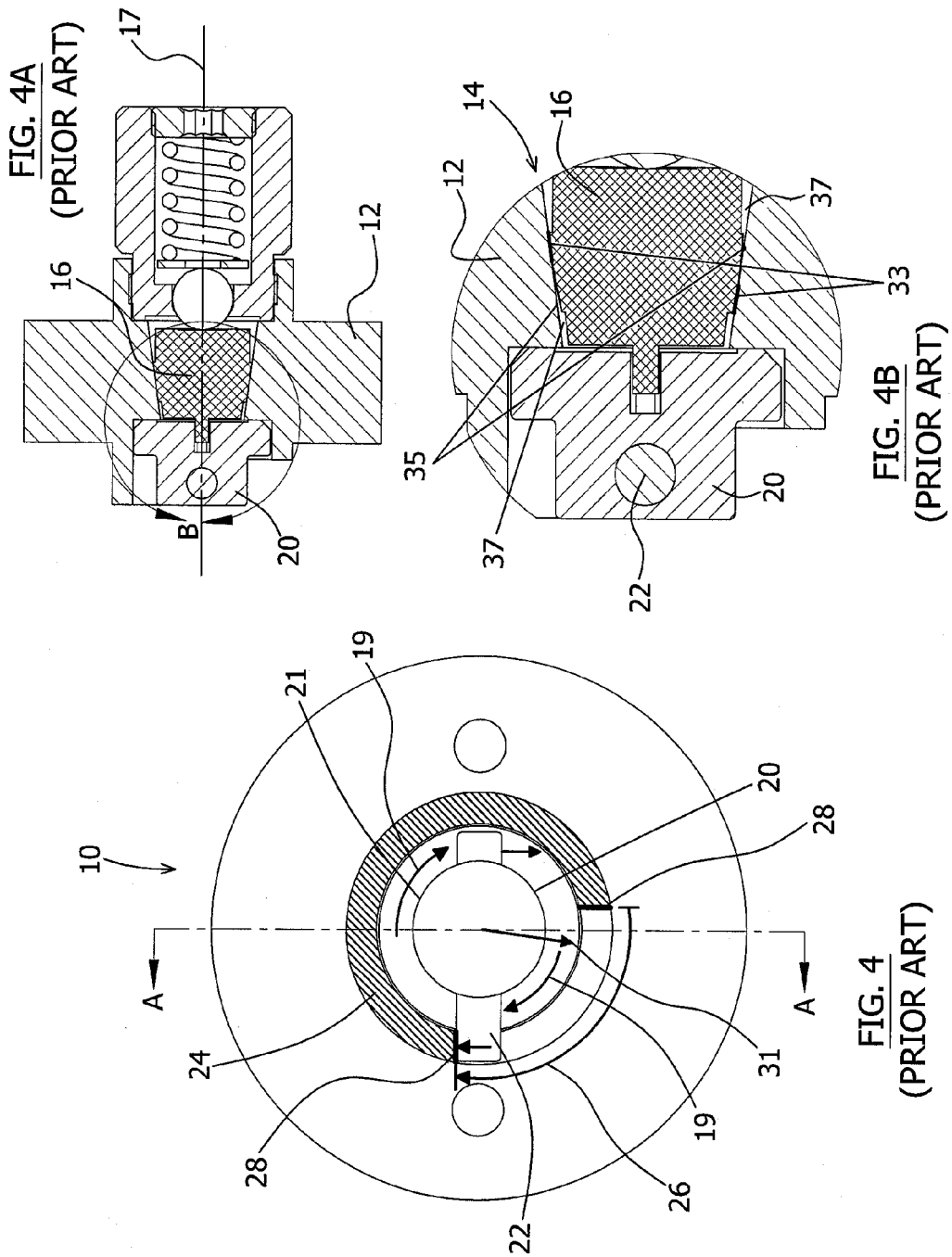

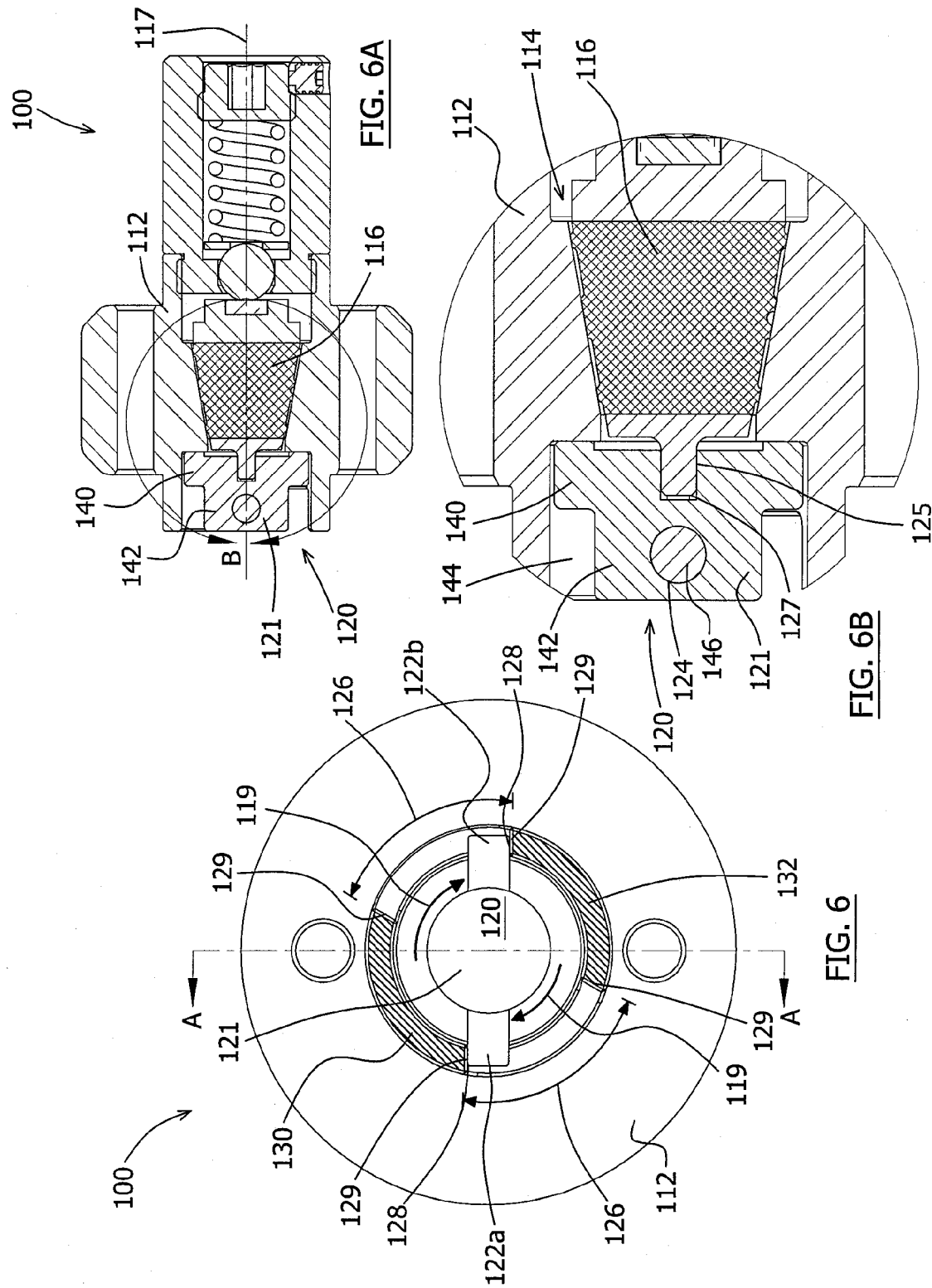

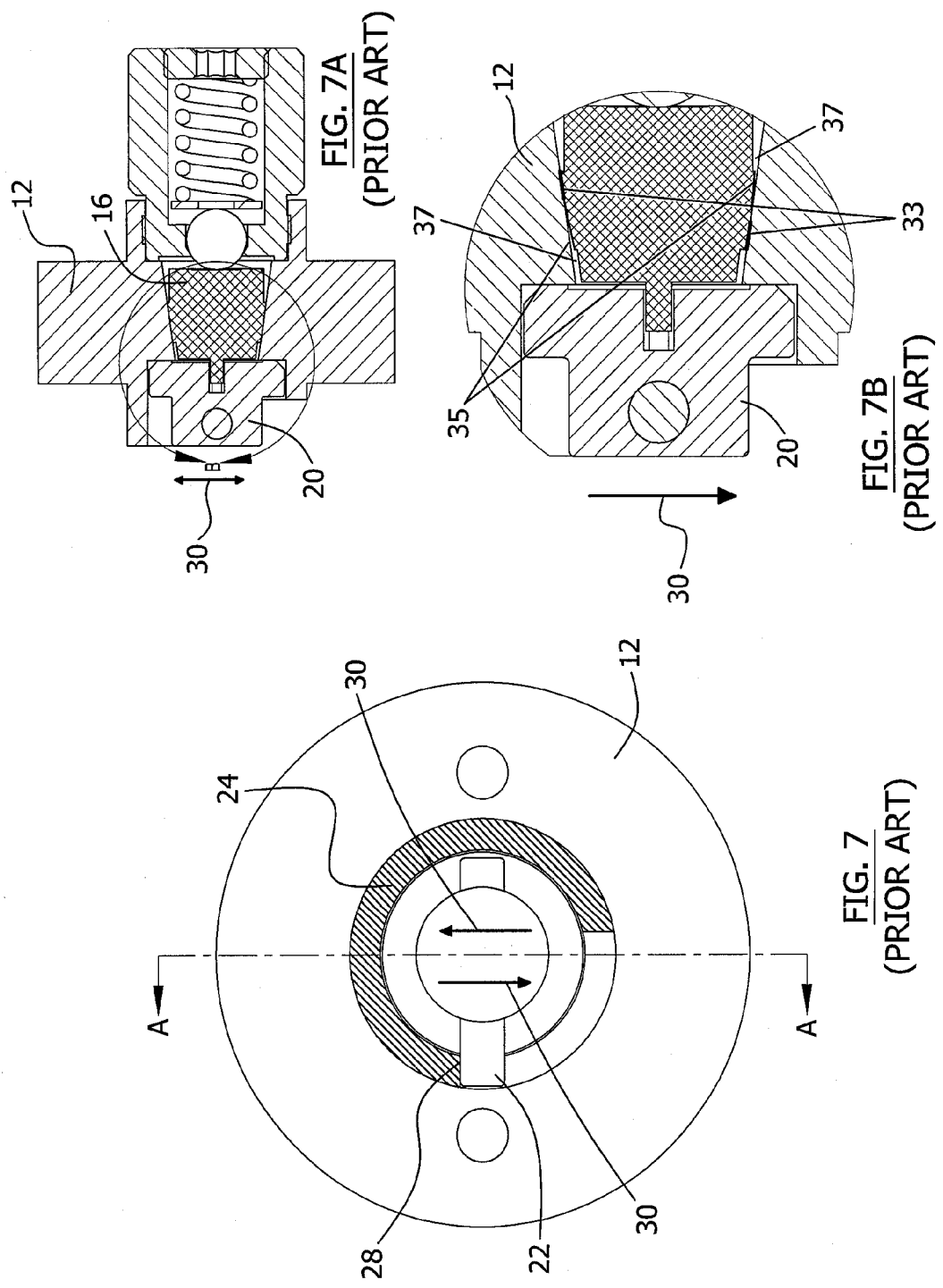

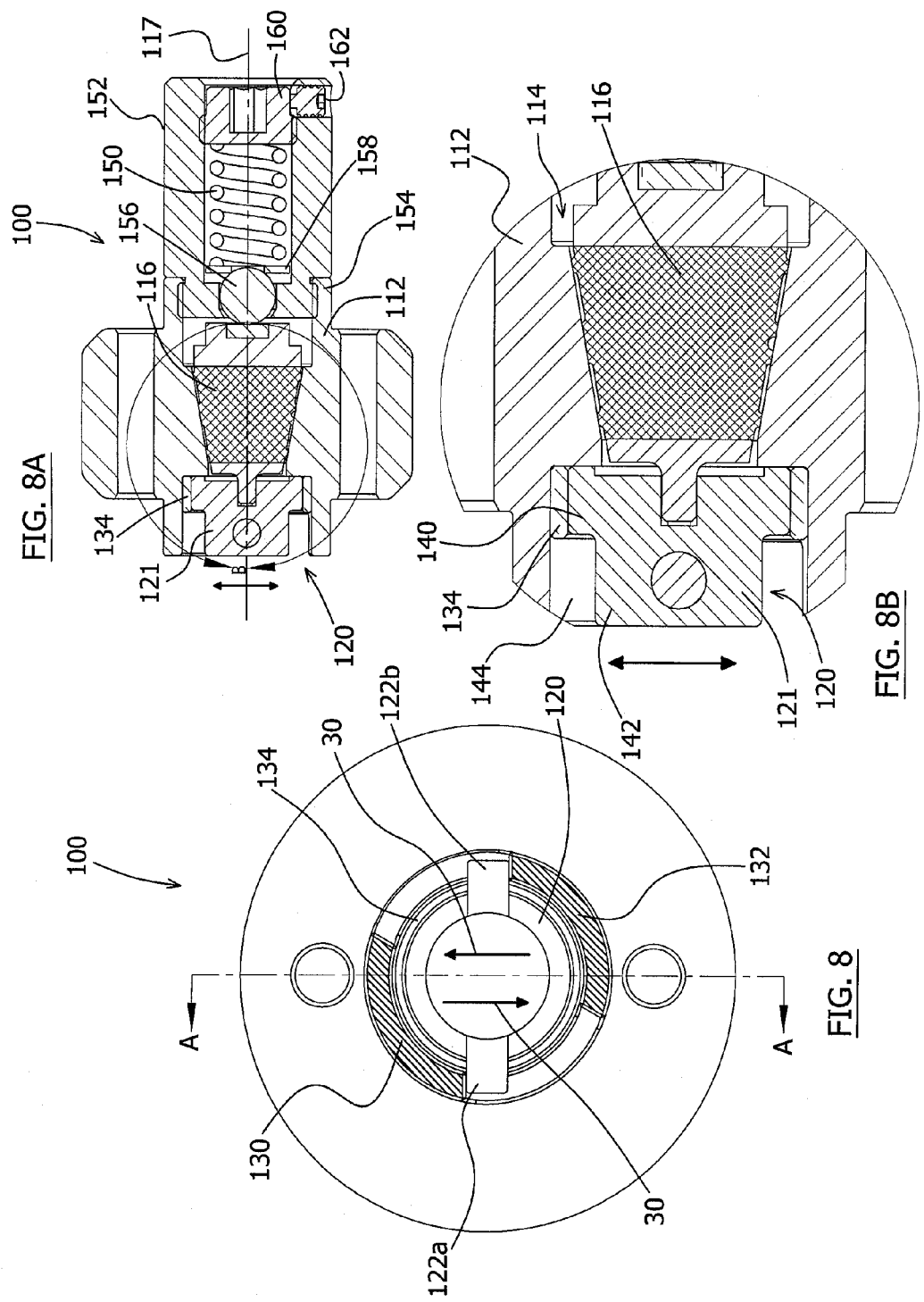

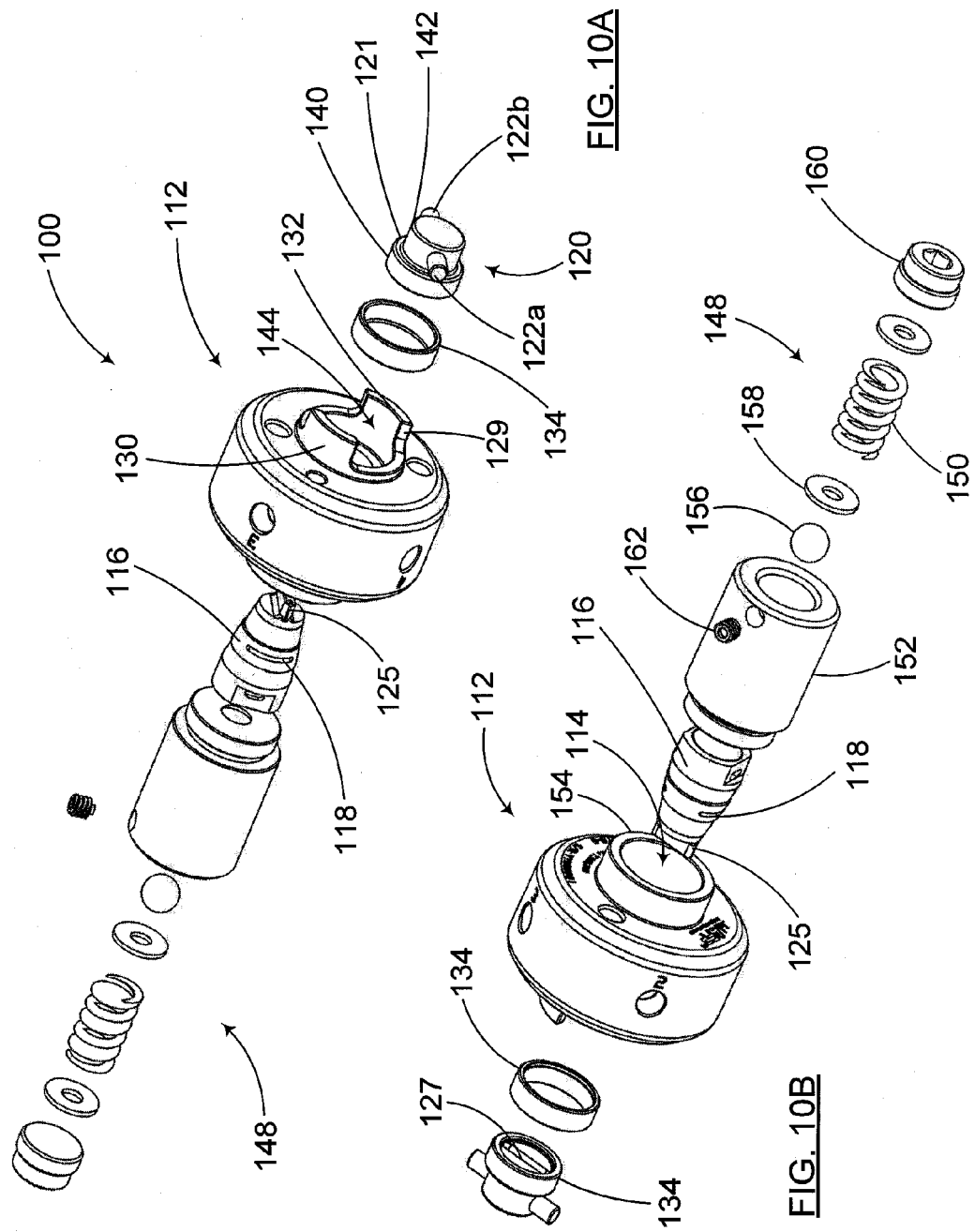

CONICAL ROTARY VALVE FOR CHROMATOGRAPHIC APPLICATIONS

CROSS-REFERENCE TO RELATED APPLICATIONS

This application claims the benefit of International Patent Application No. PCT/CA2010/001567, filed on Sep. 30, 2010, entitled "CONICAL ROTARY VALVE FOR CHROMATOGRAPHIC APPLICATIONS," which claims the benefit of U.S. Provisional Patent Application No. 61/247,164, filed on Sep. 30, 2009, entitled "IMPROVED CONICAL ROTARY CHROMATOGRAPHIC VALVE," the entire disclosures of which are incorporated herein by reference.

FIELD OF THE INVENTION

The present invention generally relates to rotary valves and more particularly concerns an improved rotary valve for chromatographic applications designed to prevent or limit leaks.

BACKGROUND

"Conical"-type rotary valves have been in use for over 40 years in chromatographic applications and various other sampling systems. Early conical valve designs include "plug" or "stopcock" valves, such as for example shown in U.S. Pat. No. 2,830,738 (Sorg et al); U.S. Pat. No. 2,211,627 (Morgan); U.S. Pat. No. 2,972,888 (Lamkin); U.S. Pat. No. 3,116,642 (Weir); U.S. Pat. No. 3,475,950 (Ferrin); U.S. Pat. No. 3,683,701 (Gunther et al); and U.S. Pat. No. 4,133,640 (Clinton et al).

Typically, a rotary valve includes a stator having a plurality of fluid-open ports therein opening on its inner surface, and a rotor coaxially extending within the stator and rotatable with respect to their common axis. The rotor has channels or grooves opening on its outer surface, disposed so that rotating the rotor to predetermined angular positions will provide fluid communication between different ports of the stator through the channels or grooves of the rotor.

Referring to FIGS. 1A and 1B (PRIOR ART), there is shown an exploded view of a conventional conical rotary valve 10. The valve 10 includes a valve body 12 acting as a stator and defining a cavity 14 in which the rotor 16 is received. As mentioned above, the stator 12 has fluid-open ports (not shown) opening on the inside surface of the cavity 14, and the rotor has grooves 18 on its surface for providing fluid communication between the ports.

Actuating means are generally provided to control the rotation of the rotor 16 about an axis of rotation 17 between the desired angular positions. For example, a valve 10 may be coupled to an electric or pneumatic rotary actuator 11, as shown in FIGS. 2A and 2B (PRIOR ART). The valve 10 may also be coupled to a linear actuator 13, as shown in FIGS. 3A and 3B (PRIOR ART), or simply actuated manually through a handle.

Such valves 10 are typically provided with a drive adaptor 20 which engages the rotor 16 and transmits a rotational actuating force 19 thereto. Typically, the drive adaptor 20 comprises a body 21 which engages the rotor 16 and a transverse actuating pin 22 which extends therefrom. In the exemplary prior art embodiment illustrated in FIGS. 2A and 2B, the rotational actuating force 19 is transferred from the actuator 11 or 13 to the pin 22 via a drive coupling 27 which extends concentrically around the body 21 and receives the pin 22 in opposed slots 29. The actuating force is therefore transferred from the actuator 11 or 13 to the pin 22 via the drive coupling 27, and from the drive adaptor 20 to the rotor 16.

On one side of the drive coupling 27, the pin 22 extends beyond the slot 29 and a stopper 24 is provided on the stator 12 so as to limit the course of the pin 22, and thereby the rotation of the rotor 16. The rotation of the rotor 16 can be limited to a quarter turn, for example, or other appropriate traveling stroke.

Conical rotary valves often present cross-contamination or inboard/outboard leaks which are unacceptable for chromatographic applications. There is therefore a need for an improved conical rotary valve for chromatographic applications which alleviates at least some of these problems.

SUMMARY OF THE INVENTION

In accordance with an aspect of the present invention, there is provided a conical rotary valve for chromatographic applications including a valve stator having a cavity therein, a valve rotor provided within the cavity and rotatable therein about an axis of rotation, a drive adaptor, and a pair of stoppers, each mounted to the stator. The drive adaptor includes a body which is rotatable about the axis of rotation and is coupled to the valve rotor for transmitting a rotating force thereto. The drive adaptor further includes a pair of radial arms projecting from the body radially outward from the axis of rotation, on opposite sides thereof. Each radial arm is movable along a respective arcuate travelling course with respect to the stator. The stoppers are each positioned to obstruct one of the radial arms at an end of the corresponding travelling course. The stoppers are positioned to simultaneously engage the radial arms.

Advantageously, it will be appreciated that this arrangement of the radial arms and stoppers balances the forces applied on the rotor and prevents torsion thereof, as such torsion could create leaks.

Preferably, the radial arms each engage their respective stopper an equal distance from the axis of rotation.

Preferably, the valve further includes a bushing fitting concentrically between the drive adaptor and the stator to prevent radial forces from being transmitted to the rotor.

Other features and advantages of the present invention will be better understood upon a reading of the preferred embodiments thereof, with reference to the written specification, claims, and appended drawings.

BRIEF DESCRIPTION OF THE DRAWINGS

FIGS. 1A and 1B (PRIOR ART) are exploded perspective views from opposite directions of a typical conical rotary valve;

FIGS. 2A and 2B (PRIOR ART) are exploded perspective views from opposite directions of a valve actuated by a typical commercial pneumatic rotary actuator;

FIG. 4 (PRIOR ART) is a top view of a conventional valve, illustrating stopper-related issues;

FIG. 4A (PRIOR ART) is a cross-section along lines A-A of FIG. 4 (PRIOR ART);

FIG. 4B (PRIOR ART) is an enlargement of section B of FIG. 4A (PRIOR ART);

FIG. 6 is a top view of a valve according to an embodiment of the present invention; FIG. 6A is a cross-section along lines A-A of FIG. 6;

FIG. 6B is an enlargement of section B of FIG. 6A;

FIG. 7 (PRIOR ART) is a top view of a valve according to prior art, illustrating problems related to the use of a linear actuator;

FIG. 7A (PRIOR ART) is a cross-section along lines A-A of FIG. 7 (PRIOR ART);

FIG. 7B (PRIOR ART) is an enlargement of section B of FIG. 7A (PRIOR ART);

FIG. 8 is a top view of a valve according to another embodiment of the present invention, adapted for use with a linear actuator;

FIG. 8A is a cross-section along lines A-A of FIG. 8;

FIG. 8B is an enlargement of section B of FIG. 8A;

FIGS. 10A and 10B are exploded perspective views from opposite directions of the valve of FIGS. 8, 8A, and 8B.

DESCRIPTION OF PREFERRED EMBODIMENTS

Figure 3A:
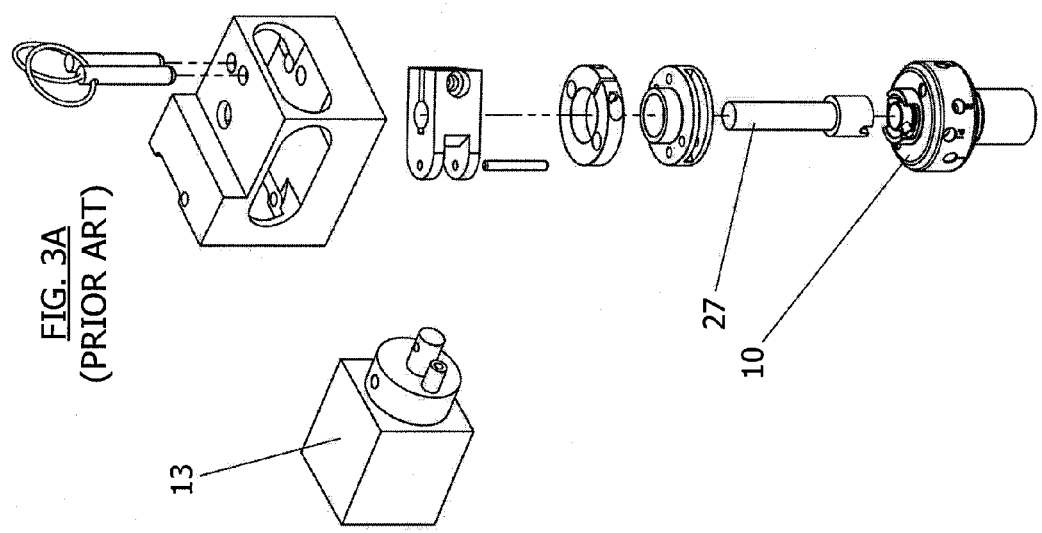
FIG. 3A (PRIOR ART) is an exploded perspective view of a linear piston actuator.

In accordance with aspects of the present invention, there are provided rotary-type valves for chromatographic applications, designed to prevent or limit leaks.

Chromatography is understood to refer to laboratory techniques involving the separation of gases or fluids. Valves for use in chromatographic applications therefore provide for the controlled circulation of samples through various paths, as required by the context of the application. For most chromatographic applications, cross-contamination or inboard/outboard leaks are important issues which may have a strong impact on the results obtained from the procedures performed and the life expectancy of the components involved.

It has been found that an important source of leaks in such valves results from deformations in the rotor due to undesirable forces applied thereto in operation.

Referring to FIGS. 4, 4A and 4B for visual support, for conventional rotary valves such as shown in FIGS. 1A and 1B, very often the rotational actuating force 19 that is applied to the actuating pin 22 by an actuator, such as the pneumatic actuator discussed above, is not stopped immediately when the pin 22 abuts on the stopper 24 at the end 28 of its arcuate travelling course 26. Rather, the actuating force 19 is released only a few moments after the drive adapter 20 engages the stopper 24. The torque applied by the valve coupling 27 (FIGS. 2A, 2B, 3A and 3B) is countered by a reaction force imparted by the stopper 24 to the pin 22 at the end 28 of its course 26. This reaction force is not aligned with the axis of rotation 17, and it has been found by the inventors that the temporary imbalance which occurs when the pin 22 has been stopped can create unequal forces on the rotor 16 and can have negative effects on the sealing properties of the valve 10.

During the short period of time where the actuating force 19 is maintained on the rotor 16 at the end 28 of its course 26, this torque can cause a deflection in the body 21 of the rotor 16 as the side of the adaptor 20 opposite the abutment between the pin 22 and the stopper 24 remains unblocked. A compressing force 31 is created as the rotor 16 is pressed against the stator 12 within the cavity 14. This can create a larger sealing force between the rotor 16 and the stator 12 in one region 33 while decreasing the sealing force in another region 35. The net effect is akin to trying to tilt or incline the rotor 16 inside the stator 12.

Figure 5A:
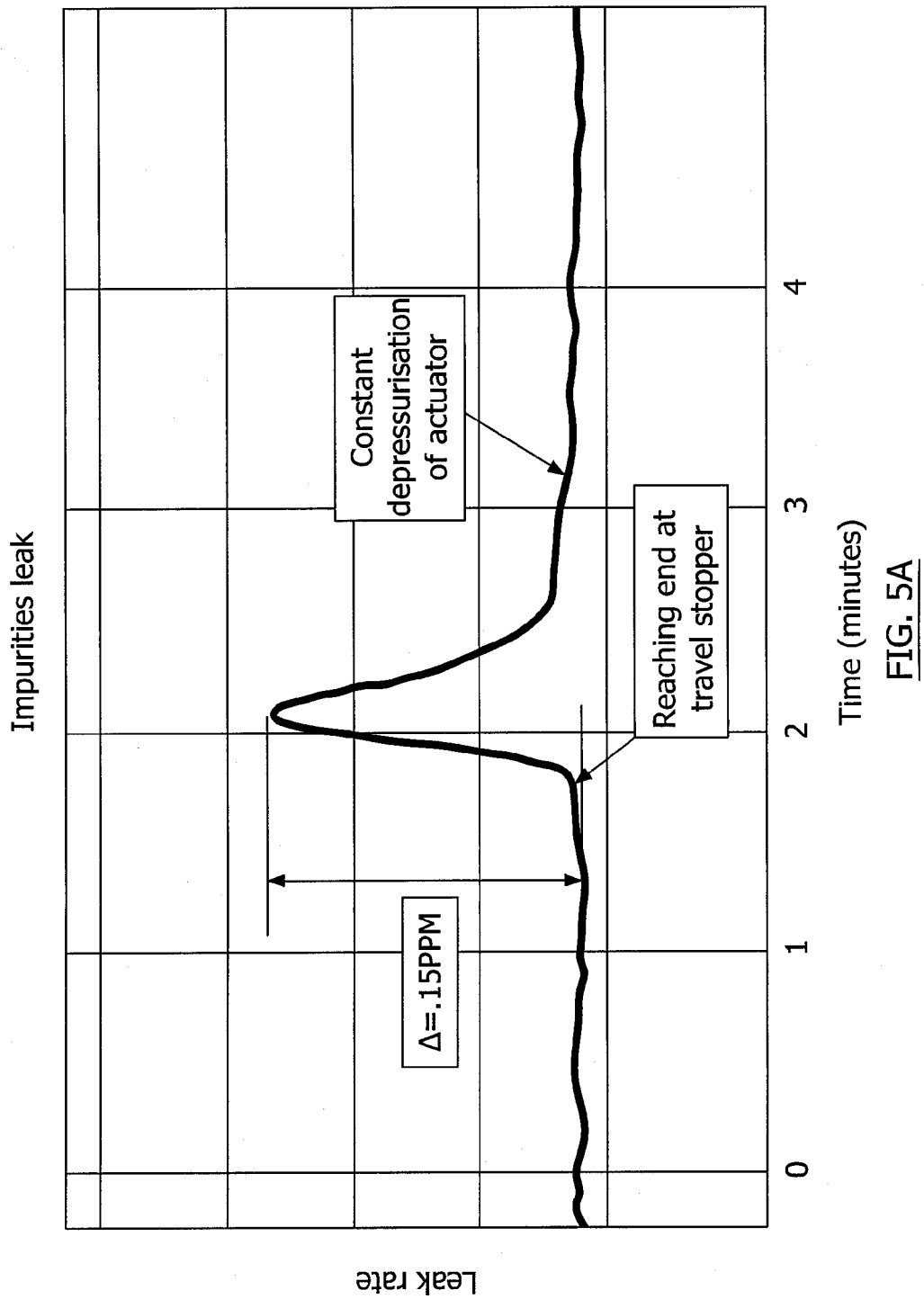
FIG. 5A is a graph showing the leak rate as a function of time when the actuating force on a prior art valve is stopped after the actuating pin reaches an end of the stopper.

The temporary, unequal forces applied in different regions 33 and 35 can cause temporary leaks that will create problems in chromatographic systems. The creation of cross port leaks in the region 35 of the rotor 16 where the sealing force is being lowered has been observed. Furthermore, this effect can also allow inboard/outboard leaks to occur from regions 37 of the rotor/stator interface adjacent to the region 35 where the sealing force is decreased. A graph illustrating a momentary pulse leak which occurs when the pin 22 engages the stopper 24 at the end 28 of its course 26 is shown in FIG. 5A.

Figure 5B:
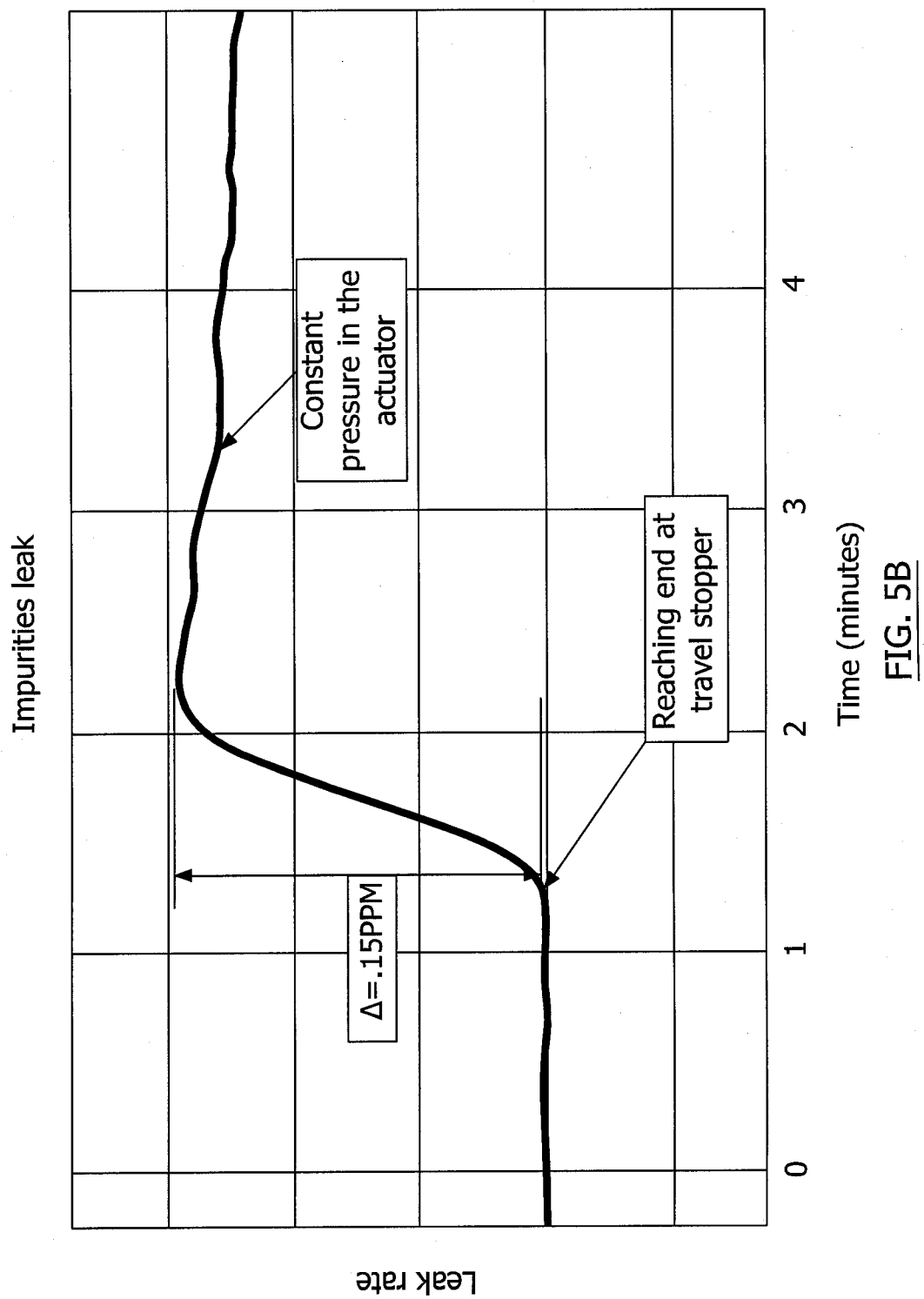
FIG. 5B is a graph showing the leak rate as a function of time when the actuating force on a prior art valve is kept constant after the actuating pin reaches an end of the stopper.

Moreover, for cost consideration, some instruments continue to apply the actuating pressure even after the rotor 16 has reached the end 28 of its travelling course 26. Doing so worsens the above-described problem, since the resultant leaks are not merely momentary but remain relatively constant over a sustained period. A graph illustrating a sustained leak caused by maintaining pressure on the adaptor 20 and the rotor 16 at the end 28 of the travel 26 is shown in FIG. 5B. One skilled in the art will readily understand that such leaks can have a negative impact on high sensitivity chromatographic systems.

Referring to FIGS. 6, 6A, and 6B, there is shown a conical rotary valve 100 according to an embodiment of the present invention which alleviates at least some of the above mentioned problems of the prior art.

The valve 100 includes a valve stator 112 and a conical valve rotor 116 which, as will be understood by one skilled in the art, includes alignable channels, grooves or the like, which connect various ports and enable the system to function as a valve. An example of such grooves 118 disposed around the outer conical surface of a rotor 116 is shown in FIGS. 10A and 10B. The rotor 116 is rotatable about an axis 117 within a correspondingly conical cavity 114 formed in the stator 112. One skilled in the art will readily understand that the expression "conical" refers to the general overall shape of the rotor 116 and the corresponding cavity 114, but that the actual shape of these components may be irregular so as not defining a perfect cone. The expression "conical" is further understood to encompass a frusto-conical shape, as is the case in the illustrated embodiments.

The stator 112 and rotor 116 may be made of any appropriate material, as would be understood by one skilled in the art. The stator 112 and rotor 116 may further each be embodied by a single component or an assembly of sub-components. For example, the stator 112 can be formed entirely from plastic, or alternatively include a metal base, formed for example from stainless steel, which is inserted in plastic. Such constructions, or indeed equivalent constructions not explicitly mentioned herein but evident to one skilled in the art, preferably comprise thermoplastic material and surface treatments to reduce friction and/or surface tension between moving parts. Preferably, the rotor 116 is embodied by a metallic base surrounded by a polymer exterior.

The valve 100 is provided with a drive adaptor 120 which engages the rotor 116 and is rotatable about the axis 117 and serves to couple the rotor 116 to an actuator. The adaptor 120 includes a body 121, which is preferably formed of a circular base 140 from which projects a stem 142. Preferably, the drive adaptor 120 is mounted at least partially in a channel 144 within the stator 112 which is opened on the cavity 114 in which the rotor 116 is received. The annular space provided around the body 121 between the stem 142 and the stator 112 is sized to receive a drive coupling, such as the drive coupling 27 shown in FIGS. 2A, 2B, 3A, and 3B.

In the illustrated embodiment, the rotor 116 is coupled to the adaptor 120 via a flange 125 extending outward from the rotor 16 and a complementary slot 127 extending along the bottom surface of the circular base 140 of the body 121 of the drive adaptor 120. The flange 125 and slot 127 extend radially with respect to the axis of rotation 117 and enable the adaptor 120 to impart the actuating force to the rotor 116. It will be appreciated, however, that various other arrangements for coupling the rotor 116 and the adaptor 120 are within the scope of the present invention.

A pair of arms 122a and 122b project radially outward, on either side of the body 121. These radial arms 122a and 122b each follow a respective arcuate travelling course 126 as the adaptor 120 is pivoted about the axis of rotation 117. In the embodiment illustrated, the radial arms 122a and 122b are formed by a single pin 146 which passes through a hole 124 in the stem 142 of the body 121 and extends radially outward on either side thereof. The portions of the pin 146 which extend outside the body 121 thereby create the radial arms 122a and 122b. Optionally, rather than the round cross-section as shown, the pin 146 may have a square or polygonal cross-section which provides a flat surface for abutment against the stoppers 130 and 132 and therefore spreads more evenly the reaction forces.

A pair of stoppers 130 and 132 is mounted to the stator 112 at opposed positions thereabout. The stoppers 130 and 132 are each positioned to obstruct one of the arms 122a and 122b at an end 128 of its course 126. In the illustrated embodiment, the stoppers 130 and 132 have stopping surfaces 129 which come into contact with a radial arm 122a or 122b, thereby defining the end 128 of its arcuate course 126. As illustrated, the stoppers 130 and 132 are embodied by two arcuate flanges extending outward from the stator 112, concentrically around the axis of rotation 117. With reference to the view from above shown in FIG. 6, the longitudinal extremities of each flange 130 and 132 define the stopping surfaces 129, while their inner surfaces at least partially define the channel 144 in which the drive adaptor 120 pivots. It will be appreciated, however, that various other embodiments of the stoppers 130 and 132 are within the scope of the present invention. For example, the two arcuate flanges 130 and 132 may be provided by appropriate structures affixed to the stator 112, or the space in which the drive adaptor 120 operates could be fully enclosed in the radial direction by the stator 112 with additional portions being cut out to enable the radial arms 122a and 122b to follow an arcuate travelling course 126 and the ends of those additionally cut out portions forming the stopping surfaces 129.

The stoppers 130 and 132 are positioned so that two stopping surfaces 129 simultaneously engage the radial arms 122a and 122b. Preferably, the stopping surfaces 129 engage the radial arms 122a and 122b proximate the outer extremities thereof.

In order to engage the stoppers 130 and 132, the radial arms 122a and 122b need not extend in a uniquely radial way, that is to say perfectly perpendicular to the body 121 and/or the axis of rotation 117. Rather, it will be appreciated that the expression "project radially outward" as used herein should be interpreted to include any arms 122a and 122b which contain some portion extending radially outward so as to simultaneously engage appropriately positioned stoppers 130 and 132 at an end 128 of an arcuate course 126. In another embodiment, the arms 122a and 122b themselves could be pointing diagonally upwards or downwards, and therefore containing a component which extends radially outward, and still both travel an arcuate course 126 and engage the stoppers 130 and 132 simultaneously.

In FIG. 6, the adaptor 120 is shown positioned with respect to the stator 112 such that the first radial arm 122a is stopped by the first stopper 130, and the second radial arm 122b is stopped by the second stopper 132. As such, these radial arms 122a and 122b can be considered to have been stopped after a clockwise rotation.

Preferably, and in accordance with the illustrated embodiment of FIG. 6, the stoppers 130 and 132 each comprise two stopping surfaces 129, one of which is positioned and oriented to obstruct the first radial arm 122a and the other of which is positioned and oriented to obstruct the second radial arm 122b. As such, when the adaptor 120 has been rotated from its illustrated position in a counter-clockwise direction and the radial arms 122a and 122b have reached the opposite ends 128 of their respective arcuate travelling courses 126, the first radial arm 122a will be stopped by the second stopper 132 and vice versa.

By providing two opposed radial arms 122a and 122b which simultaneously engage opposed stoppers 130 and 132, the continuing application of a rotational actuating force 119 thereon, whether temporary or sustained, is significantly more balanced. Preferably, and as illustrated, the arms 122a and 122b each engage a respective stopper 130 and 132 at an equal radial distance from the axis of rotation 117, which results in equal and opposite rotational forces on the adaptor 120 and the rotor 116. In this manner, the deflection of the rotor 116 explained above is avoided, and the leaks associated therewith can be prevented.

Figure 3B:
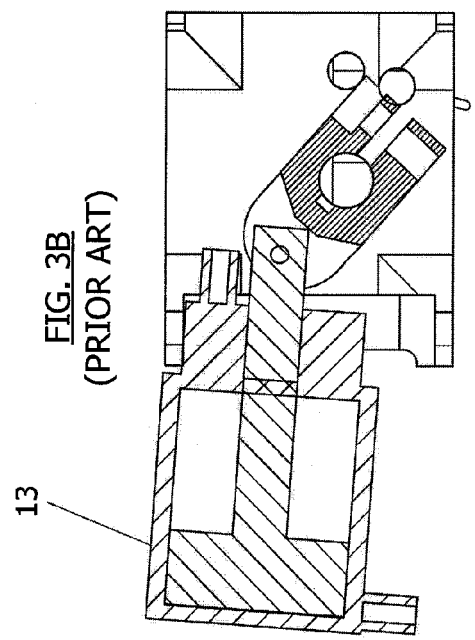
FIG. 3B (PRIOR ART) is a cross-sectional view of the linear actuator of FIG. 3A (PRIOR ART), illustrating its operation.

An additional source of leaks can arise with conventional rotary valves when using a linear piston actuator, such as the actuator 13 shown in FIGS. 3, 3A and 3B. With reference to FIGS. 7 (PRIOR ART), 7A (PRIOR ART) and 7B (PRIOR ART), additional linear forces 30 can be imparted to the rotor 16 from the linear components of the actuating force. These linear components are applied through the axis of rotation 17 and can therefore be considered radial forces. In response to these radial forces 30, the rotor 16 acts as a bearing, generating unequal wear. The conventional drive adaptor 20 typically has some clearance around it when it is installed into the stator 12. This clearance is not always the same from valve to valve or batch to batch, and the radial load transferred to the rotor's seal will vary depending on this clearance.

As before, this imbalance can increase the sealing force at region 33 and reduce it at region 35, potentially leading to cross port leaks, as well as inboard/outboard leaks at region 37. Such working behaviour reduces the lifetime of the valve and also has a negative impact on high performance chromatographic systems. In practice, the rotor 16 can be manufactured from various materials in accordance with the chemical compatibility of the sample and temperature of use. The softer the sealing material of the rotor 16, the worse become the problems cited above.

Referring to FIGS. 8, 8A, and 8B, an embodiment of the valve 100 is illustrated which includes a bushing 134 provided between the adaptor 120 and the stator 112, concentric to the rotor 116 and the axis of rotation 117. The bushing 134 is ring-shaped so as to fit around the base 140 of the adaptor 120 and advantageously isolates the seal material of the rotor 116 from damaging radial forces 30 caused by a linear piston type actuator and ensures the proper alignment of the adapter 120 with respect to the stator 112. Preferably, the bushing 134 is press-fit within the channel 144 and therefore remains fixed to the stator 112. Alternatively, the bushing 134 can be fixed around the base 140 and rotated about the axis 117 along with the adaptor 120.

The bushing 134 can be made of brass or any appropriate material. As will be readily understood by one skilled in the art the bushing will advantageously absorb the radial forces 30 applied by the actuator, preventing the transfer of these forces to the rotor and therefore preventing related leaks.

Figure 9:
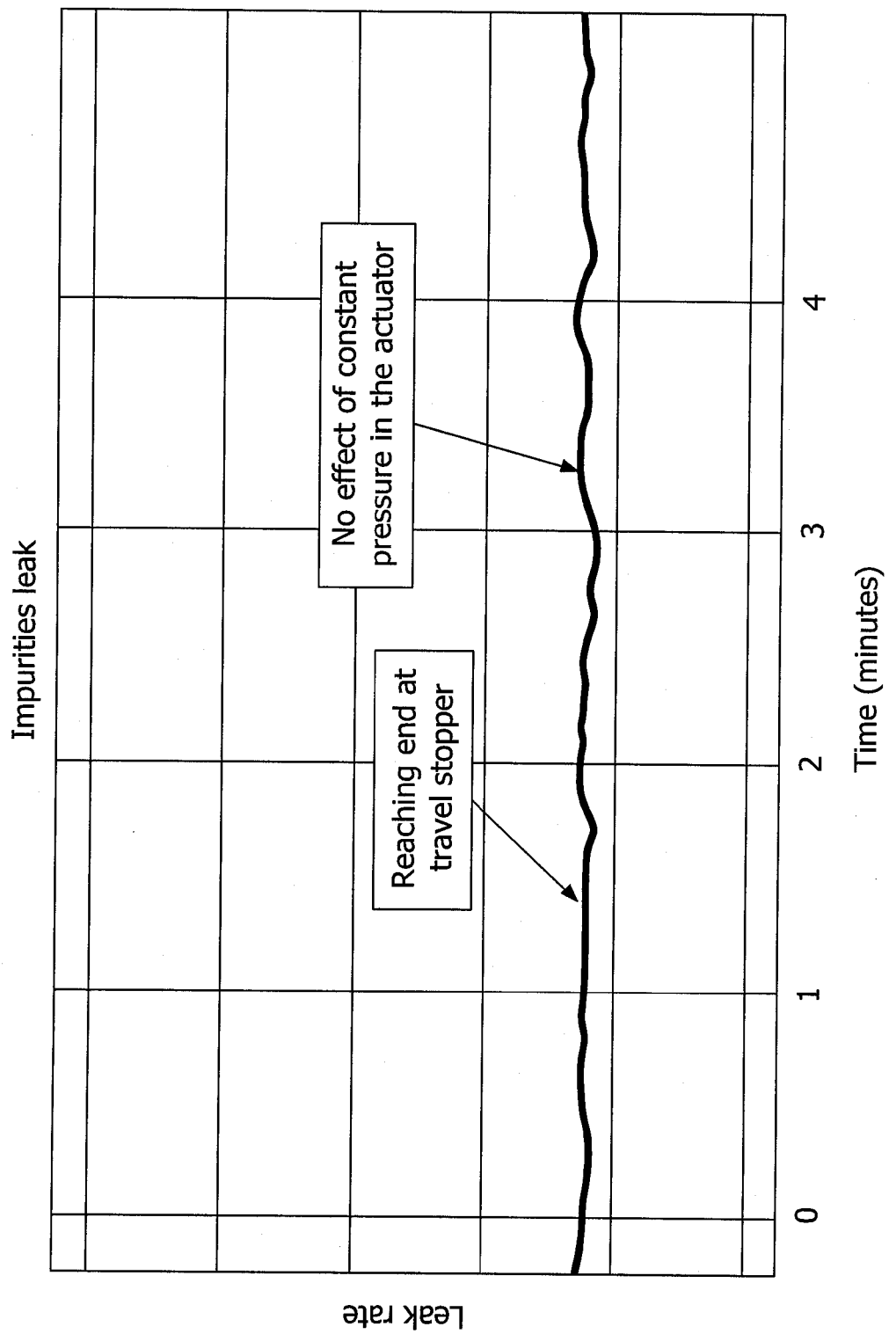
FIG. 9 is a graph showing the leak rate as a function of time using a valve as shown in FIG. 6 or 8.

FIG. 9 shows typical performances obtained using a valve 100 according to an embodiment of the invention, used in the same conditions as the previous test shown in FIGS. 5A and 5B. Advantageously, it was also observed that valves according to the present invention show less wear for the same number of actuations than conventional valves, leading to a longer useful life.

FIGS. 10A and 10B show the components of the valve 100 of FIGS. 8, 8A, and 8B in respective exploded views. In addition to the aforementioned stator 112, rotor 116 and drive adaptor 120, the valve 100 may include a rotor positioning assembly 148. The rotor positioning assembly 148 functions to keep the rotor 116 in place within the conical cavity 114. Moreover, the rotor positioning assembly 148 can be used to ensure a proper contact between the rotor 116 and the stator 112 during operation. As will be appreciated by one skilled in the art, the rotor positioning assembly 148 can be embodied by a wide variety of structures, mechanisms, components, devices or other arrangements which fulfill either or both of these roles and typically comprises a spring or other resilient member which presses the rotor 116 against the inner surface of the stator 112.

In the embodiment illustrated in FIG. 10, and by way of example only, the rotor positioning assembly 148 is mounted to the stator 112 at a position opposite the drive adaptor 120 with respect to the rotor 116. The assembly 148 comprises a spring 150 housed within a cylinder 152 which is attached to a complementary socket 154 disposed around the cavity 114 along the underside of the stator 112. Preferably, the cylinder 152 is screwed into the socket 154 via complementary threaded portions. With additional reference to FIG. 8A, the spring 150 presses a hardened sphere 156, such as a ball bearing, towards the rotor 116. As shown, a washer 158 can be positioned between the spring 150 and the hardened sphere 156 in order to increase stability. Opposite the hardened sphere 156, the spring 150 is constrained by a pressure adjusting screw 160 which is screwed into the free extremity of the cylinder 152. Preferably, the cylinder 152 and the pressure adjusting screw 160 have complementary fine pitch threaded portions which enable a fine adjustment of the screw 160 and hence the pressure exerted by the spring 150 on the rotor 116. The pressure adjusting screw 160 is itself kept in place by a lock screw 162.

It will be appreciated by one skilled in the art that a rotary valve according to an embodiment of the present invention could be used in conjunction with a rotary actuator such as that shown in FIGS. 2A and 2B (PRIOR ART), a linear actuator such as that shown in FIGS. 3A and 3B (PRIOR ART), or indeed another type of actuator not discussed herein.

Of course, numerous modifications could be made to the embodiments above without departing from the scope of the invention.

What is claimed is:

1. A conical rotary chromatography valve comprising:
   a valve stator having inner and outer surfaces, and having a conical cavity therein;
   a conical valve rotor provided within the conical cavity and rotatable therein about an axis of rotation, the conical valve rotor having an outer surface in contact with the inner surface of the valve stator, defining a interface;
   a plurality of grooves provided on the outer surface of the valve rotor, the grooves defining channels on said interface between the inner surface of the valve stator and the outer surface of the conical valve rotor;
   a plurality of ports provided on the outer surface of the valve stator, the ports being connectable through alignment of the channels upon rotation of the conical valve rotor;
   a drive adaptor comprising a body rotatable about the axis of rotation and coupled to the valve rotor for transmitting a rotating force thereto, the drive adaptor further comprising a pair of radial arms projecting from the body radially outward from the axis of rotation on opposite sides thereof, each radial arm of the pair being movable along a respective arcuate travelling course with respect to the stator, the drive adapter comprising a circular base and a stem projecting therefrom;
   a pair of stoppers extending from the stator at a position to obstruct one radial arm of the pair at an end of the corresponding travelling course, the stoppers being positioned to simultaneously engage the radial arms at a first equal radial distance from the axis of rotation, balancing the sealing forces on the interface when the radial arms reach the end of their corresponding travelling course;
   a bushing provided concentrically between the circular base of the drive adaptor and the stator, radially isolating the drive adaptor from the stator, the stem of the drive adaptor and the stoppers defining an annular space adjacent the bushing to receive a drive coupling.

2. The conical rotary chromatography valve of claim 1, wherein the radial arms are formed by a pin.

3. The conical rotary chromatography valve of claim 2, wherein the body of the drive adaptor has a hole through which the pin passes.

4. The conical rotary chromatography valve of claim 1, wherein the drive adaptor comprises a slot and the rotor comprises a flange sized and shaped to fit within the slot.

5. The conical rotary chromatography valve of claim 1, wherein each stopper is an arcuate flange extending concentrically around the axis of rotation.

6. The conical rotary chromatography valve of claim 1, in combination with an actuator engaging the drive adaptor for rotating the same.

7. The combination of claim 6, wherein the actuator is a rotary actuator.

8. The combination of claim 6, wherein the actuator is a linear actuator.

9. The combination of claim 6, wherein the actuator is a handle.

10. The conical rotary chromatography valve of claim 1, wherein the bushing is a ring with inner and outer faces extending between first and second end faces, the inner face contacting the drive adaptor and the outer and one of the first or second end faces contacting the stator.

11. The conical rotary chromatography valve of claim 10, wherein the one of the inner and outer face of the bushing is a bearing surface configured to slide against the stator or drive adaptor upon rotation of the drive adaptor.

12. The conical rotary chromatography valve of claim 11, wherein the bushing comprises of a hard, low friction material.

13. The conical rotary chromatography valve of claim 12, wherein the hard, low friction material is brass.

14. The conical rotary chromatography valve of claim 1, wherein the plurality of ports is at least four ports.

15. The conical rotary chromatography valve of claim 1, wherein the outer surface of the valve rotor is made of a polymer.

* * * * *